US006922545B2

United States Patent
Nakatsugawa

(10) Patent No.: US 6,922,545 B2
(45) Date of Patent: Jul. 26, 2005

(54) VEHICLE COMPARTMENT RADIO LAN SYSTEM

(75) Inventor: Yoshinori Nakatsugawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 537 days.

(21) Appl. No.: 09/780,497

(22) Filed: Feb. 12, 2001

(65) Prior Publication Data

US 2001/0014585 A1 Aug. 16, 2001

(30) Foreign Application Priority Data

Feb. 14, 2000 (JP) .................................... P 2000-035589

(51) Int. Cl.⁷ ................................................ H05B 7/15
(52) U.S. Cl. .................. 455/11.1; 455/500; 455/517
(58) Field of Search ........................ 455/11.1, 500, 455/517, 345, 535.1, 431, 414.1, 417, 458, 344, 66.1, 41, 427, 435.1; 359/152, 172; 370/908; 375/130, 141

(56) References Cited

U.S. PATENT DOCUMENTS

| 4,313,208 A | * | 1/1982 | Kavenik ...................... 455/42 |
| 5,559,865 A | * | 9/1996 | Gilhousen ................... 455/431 |
| 5,600,333 A | * | 2/1997 | Justice et al. ............... 343/713 |
| 5,603,080 A | | 2/1997 | Kallander et al. |
| 5,634,209 A | | 5/1997 | Prudhomme et al. |
| 5,805,807 A | | 9/1998 | Hanson et al. |
| RE36,076 E | * | 2/1999 | Bryant et al. ................ 343/713 |
| 5,880,867 A | * | 3/1999 | Ronald ........................ 398/119 |
| 5,970,395 A | * | 10/1999 | Weiler et al. ............. 455/67.13 |
| 6,002,929 A | * | 12/1999 | Bishop et al. ............... 455/431 |
| 6,055,425 A | * | 4/2000 | Sinivaara .................... 455/431 |
| 6,154,663 A | * | 11/2000 | Itamochi .................. 455/569.2 |
| 6,269,243 B1 | * | 7/2001 | Corbefin et al. ............ 455/431 |
| 6,483,865 B1 | * | 11/2002 | Beierle ....................... 375/130 |
| 6,539,028 B1 | * | 3/2003 | Soh et al. ................... 370/445 |
| 2002/0028655 A1 | * | 3/2002 | Rosener et al. .............. 455/16 |
| 2002/0160773 A1 | * | 10/2002 | Gresham et al. ............ 455/431 |
| 2003/0009761 A1 | * | 1/2003 | Miller et al. .................. 725/76 |

FOREIGN PATENT DOCUMENTS

| JP | 8-213998 | 8/1996 |
| JP | 11-234208 | 8/1999 |

* cited by examiner

Primary Examiner—Nick Corsaro
Assistant Examiner—Tan Trinh
(74) Attorney, Agent, or Firm—Oblon, Spivak, McClelland, Maier & Neustadt, P.C.

(57) ABSTRACT

This invention provides a vehicle compartment radio LAN system for communicating with a terminal installed in a vehicle compartment through a repeater, wherein a repeater is provided in front of each seat row. Thus, a terminal installed in a front seat communicates by radio through a repeater, a terminal installed in a second seat communicates by radio through another repeater and a terminal installed in a third seat communicates by radio through still another repeater.

7 Claims, 14 Drawing Sheets

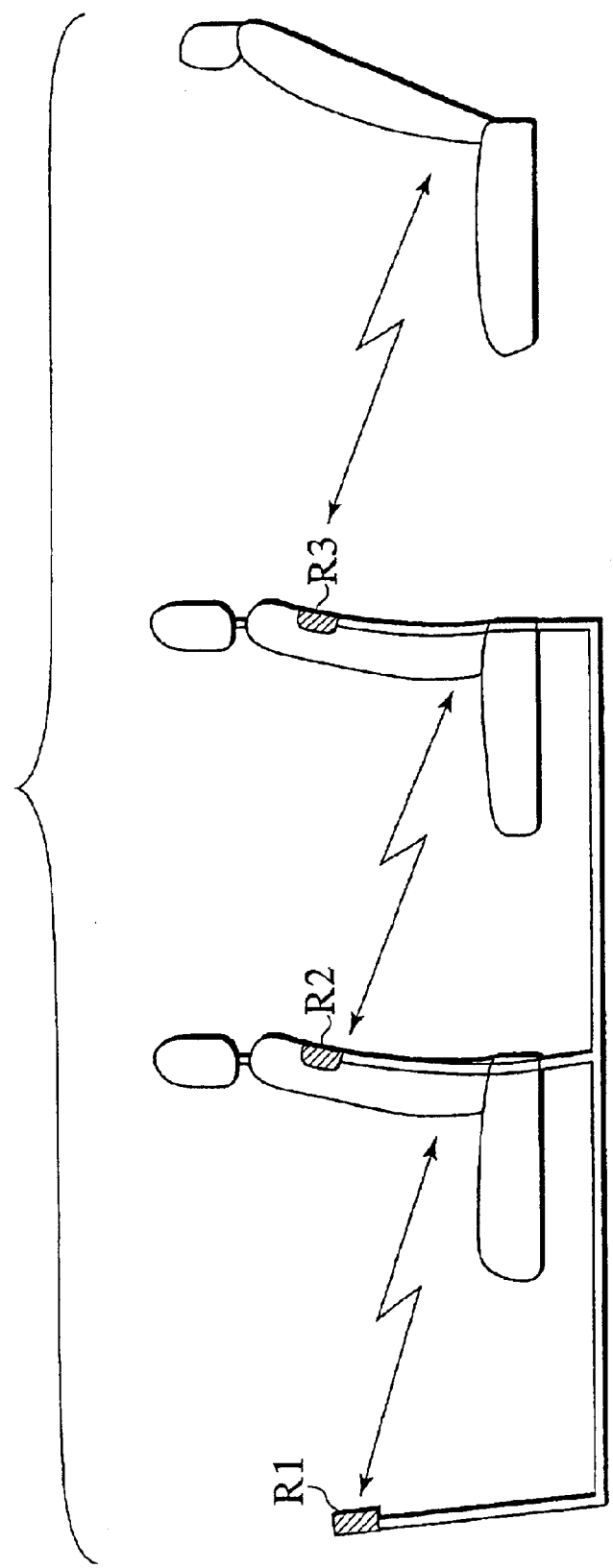

VEHICLE COMPARTMENT RADIO LAN SYSTEM

CROSS REFERENCE TO RELATED APPLICATION

This application claims benefit of priority under 35 U.S.C. § 119 to Japanese Patent Application No.2000-35589, filed on Feb. 14, 2000, the entire contents of which are incorporated by reference herein.

BACKGROUND OF THE INVENTION

1. Field of the Invention

The present invention relates to a vehicle compartment radio LAN system and more particularly to a vehicle compartment radio LAN system which enables communication between terminals provided on different seat rows by providing each seat row with a repeater.

2. Description of the Related Art

In a conventional vehicle compartment radio LAN system, a radio terminal is mounted in front of a front seat such as dash board so as to communicate with another terminal installed in a front seat by radio.

In a conventional radio LAN system in office room or the like, as shown in FIG. 1, repeaters 102a, 102b, 102c connected to a wired LAN 101 are mounted on the ceiling, so that terminals 103a, 103b, 103c communicate with the repeaters mounted vertically above them. That is, it is so constructed that the terminal 103a communicates with the repeater 102a, the terminal 103b communicates with the repeater 102b and the terminal 103c communicates with the repeater 102c.

However, if the radio terminal is just mounted in front of the front seat like in the aforementioned conventional radio LAN system, the seats turn to a shielding object. As a result, a terminal brought into a second seat or third seat cannot communicate with the terminal in front of the front seat, which is a conventional problem to be solved.

Further, there is another problem that radio communication cannot be carried out between terminals in each seat row, such as in the gap between the front seat and the second seat or in the gap between the second and the third seat.

In the indoor radio LAN system, a sufficient space can be secured vertically above the terminal like in office, so that there is no possibility that any shielding object may enter between the repeater and terminal. Therefore, radio communication is secured continuously in an environment in which the terminal or shielding object is semi-fixed. However, there is such a problem that radio communication cannot be carried out continuously between the terminal and repeater under such an environment in which the terminal and shielding object may be moved as vehicle compartment and factory.

SUMMARY OF THE INVENTION

Accordingly, the present invention has been achieved in views of the above described problems and therefore, an object of the invention is to provide a vehicle compartment radio LAN system allowing communication between terminals installed in different seat rows and further allowing continuous communication even under such an environment in which no sufficient space can be secured and a terminal or a shielding object may be moved as a vehicle compartment.

To achieve the above object, according to an aspect of the present invention, there is provided a vehicle compartment radio LAN system for communicating with a terminal installed in vehicle compartment through a repeater by radio wherein each repeater is mounted in front of each seat row.

According to the present invention, communication is enabled between terminals installed in different seat rows.

Further, according to another aspect of the present invention, there is provided a vehicle compartment radio LAN system for communicating with a terminal installed in vehicle compartment through a repeater by radio wherein plural repeaters are mounted for each seat row at a position allowing radio communication with a terminal installed in each seat row and radio communication is carried out by selecting a repeater securing an optimum communication state from the plural repeaters.

According to the present invention, continuous radio communication is allowed even under such an environment in which no sufficient space can be secured and a terminal or shielding object may be moved as the vehicle compartment.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a diagram for explaining communication by a repeater in the vehicle compartment radio LAN system shown in FIG. 2;

DESCRIPTION OF THE PREFERRED EMBODIMENTS

Hereinafter, an example of installation of the repeater according to the vehicle compartment radio LAN system of the first embodiment will be described with reference to the accompanying drawings.

Figure 1:
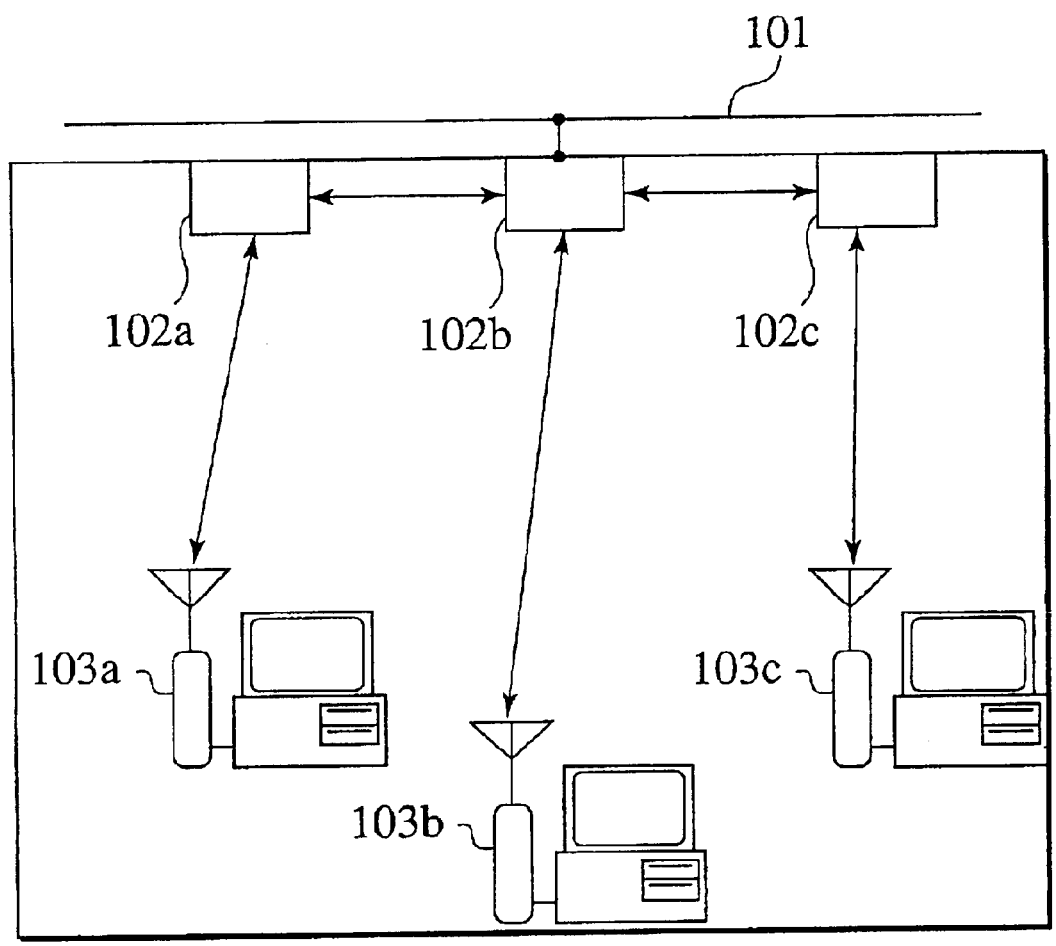
FIG. 1 is a diagram for explaining a conventional indoor radio LAN system.
Figure 2:
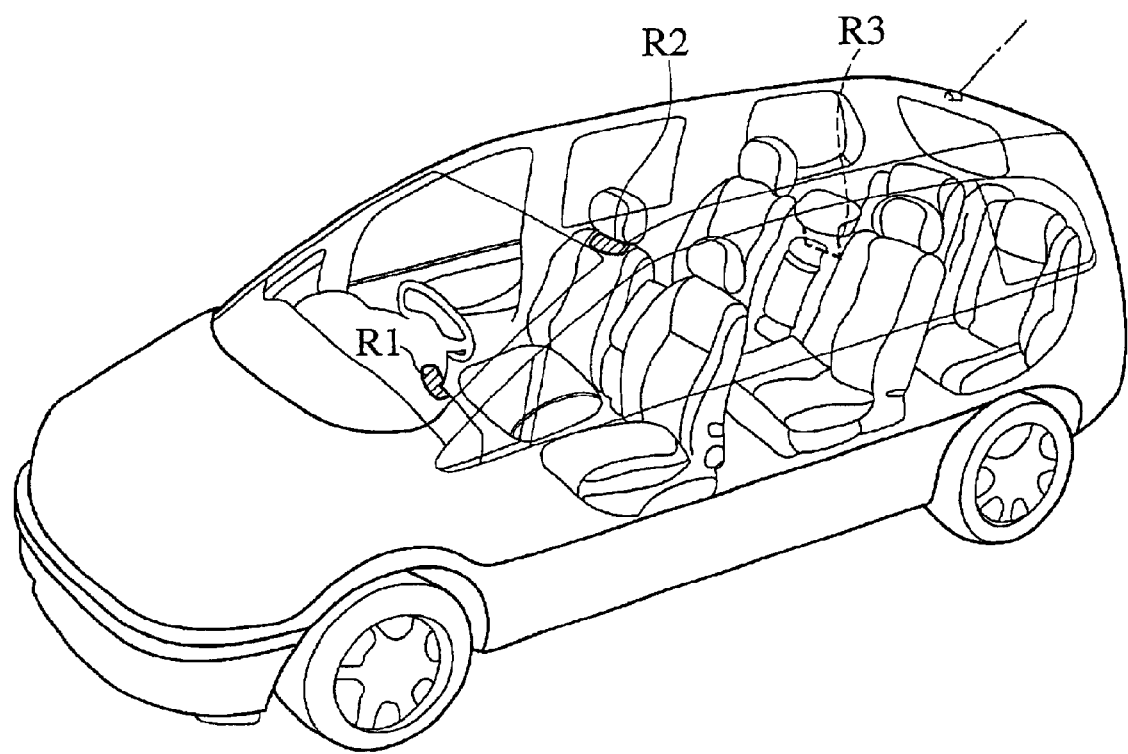
FIG. 2 is a perspective view showing a first installation example of a first embodiment of a vehicle compartment radio LAN system of the present invention.
Figure 3A:
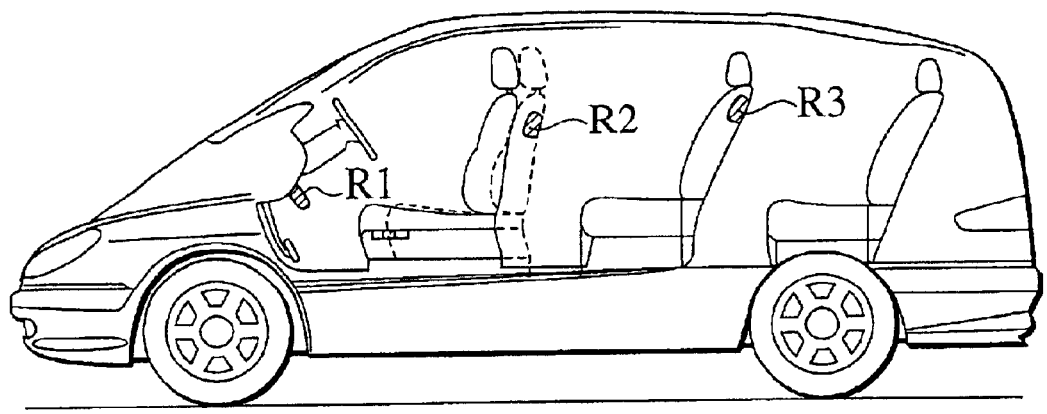
FIGS. 3A, 3B are a side view and a plan view of the first installation example of the first embodiment of the vehicle compartment radio LAN system of the present invention.
Figure 3B:
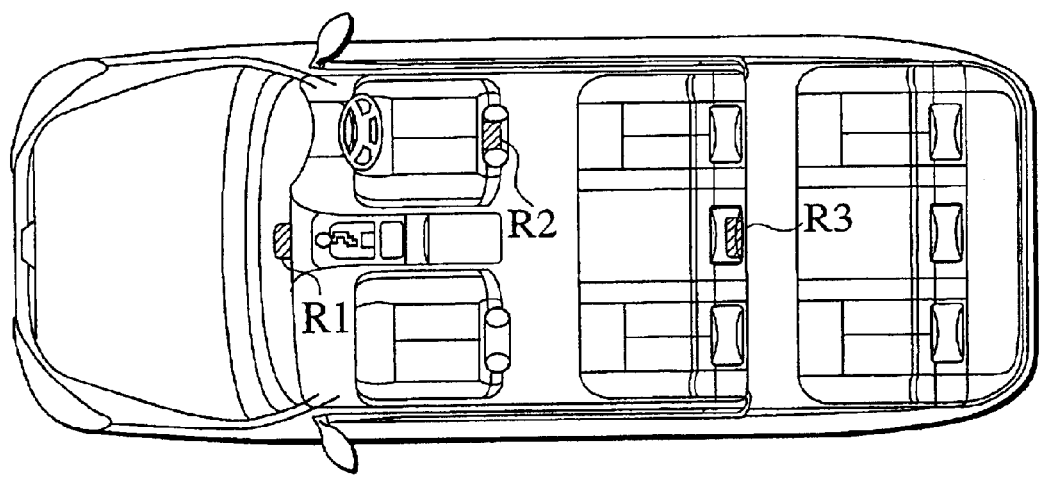

FIG. 2 is a perspective view showing a first installation example. FIGS. 3A, 3B are a side view and a plan view of the first installation example. As shown in FIG. 2 and FIGS. 3A, 3B, a repeater R1 is mounted on a dash board in front of the front seat. A repeater R2 is mounted on the back of the front seat (the driver's seat in FIG. 2) just in front of a second seat and a repeater R3 is mounted on the back of the second seat just in front of a third seat.

Therefore, as shown in FIG. 4, a terminal installed in the front seat is capable of communicating with the repeater R1 and a terminal installed in the second seat is capable of communicating with the repeater R2. Further, a terminal installed in the third seat is capable of communicating with the repeater R3.

Figure 5:
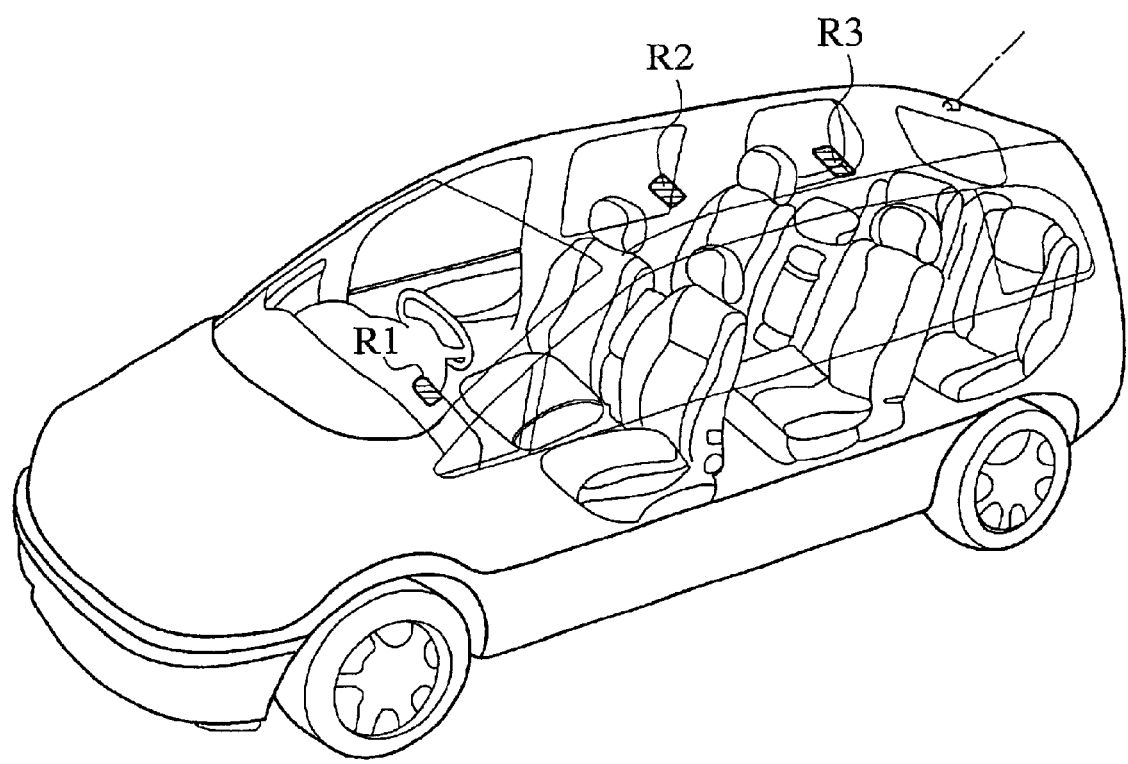
FIG. 5 is a perspective view showing a second installation example of the first embodiment of the vehicle compartment radio LAN system of the present invention.

FIG. 5 is a perspective view showing a second installation example. As shown in FIG. 5, the repeater R1 is mounted on the dash board in front of the front seat, the repeater R2 is mounted on a ceiling in front of the second seat and the repeater R3 is mounted on the ceiling in front of the third seat.

Figure 6:
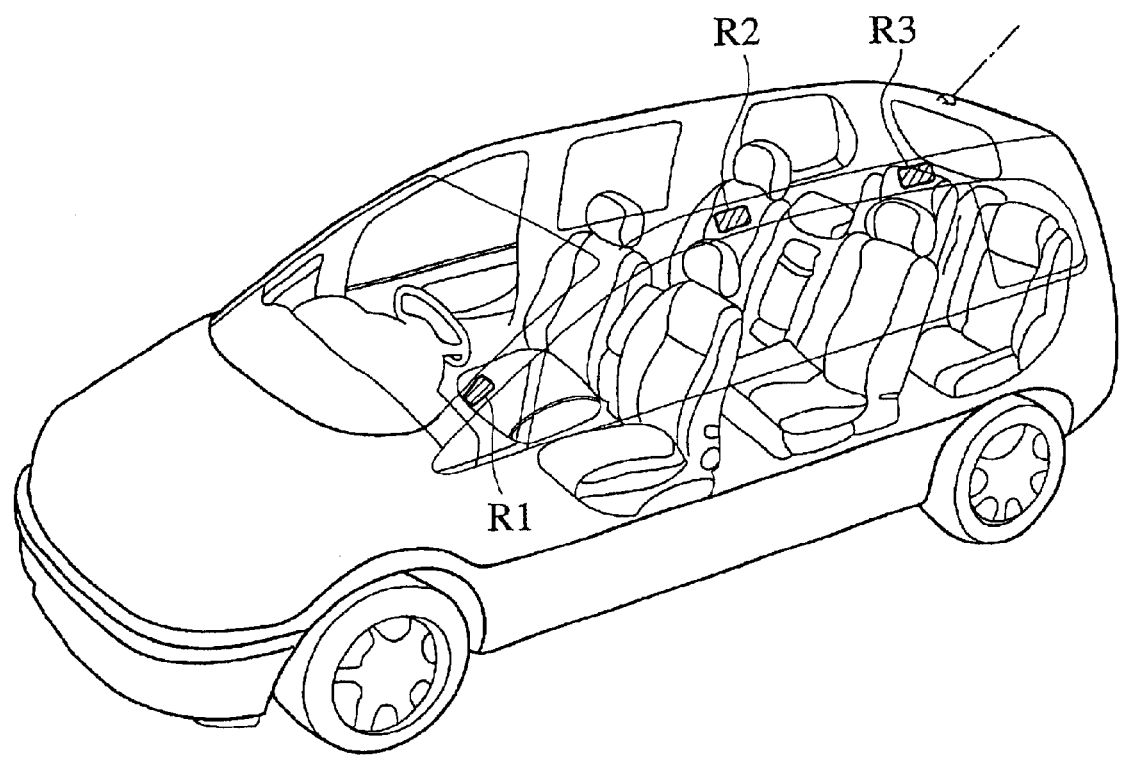
FIG. 6 is a perspective view showing a third installation example of the first embodiment of the vehicle compartment radio LAN system of the present invention.

Further, FIG. 6 is a perspective view showing a third installation example. As shown in FIG. 6, the repeater R1 is mounted on a front pillar in front of the front seat, the repeater R2 is mounted on a front end of a drip line in front of the second seat and the repeater R3 is mounted on a rear end of the drip line in front of the third seat.

Figure 7:
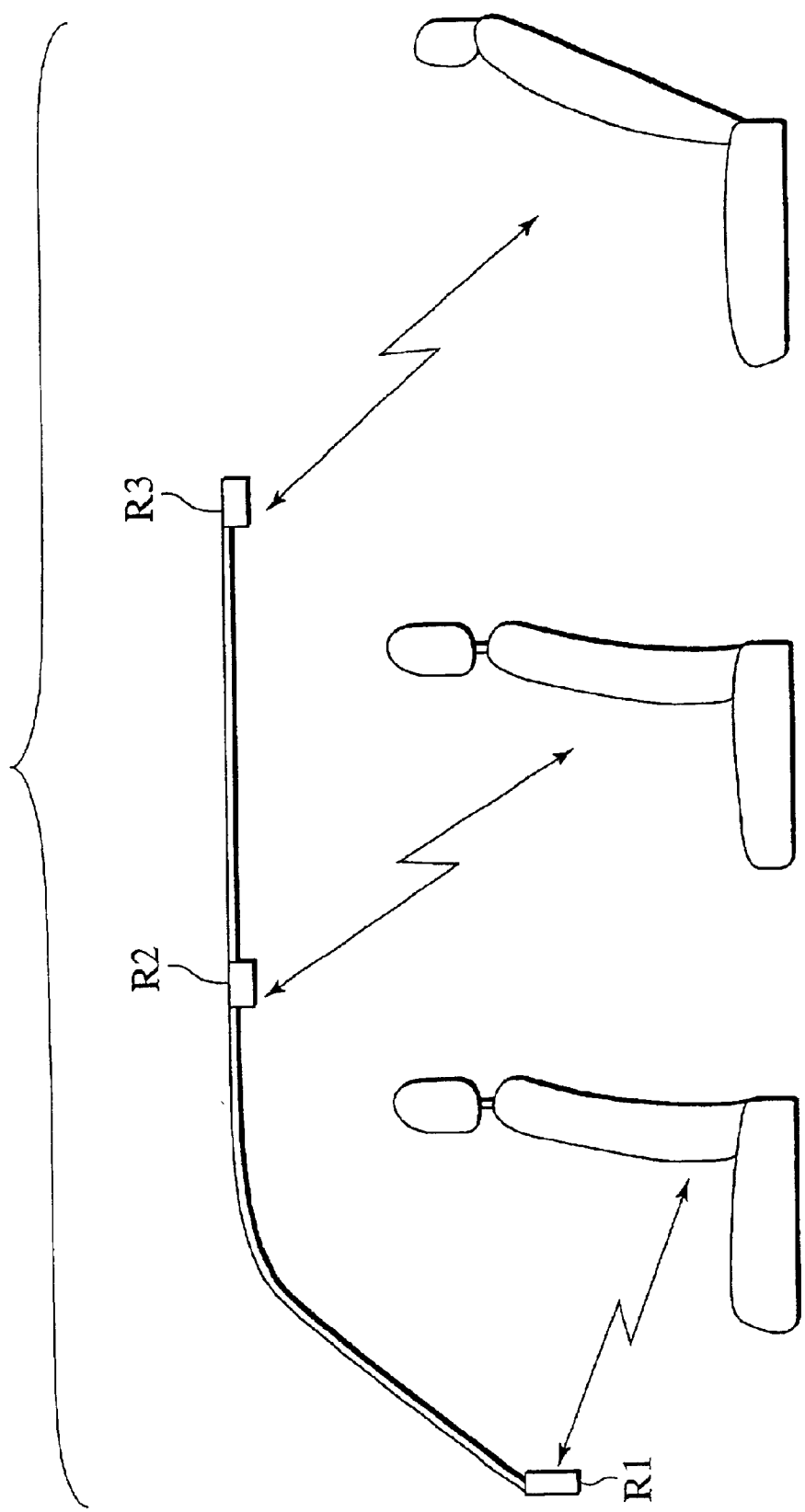
FIG. 7 is a diagram for explaining communication by a repeater in the vehicle compartment radio LAN system shown in FIGS. 5, 6.

In the second and third installation examples, as shown in FIG. 7, a terminal placed on the front seat is capable of communicating with the repeater R1, a terminal placed on the second seat is capable of communicating with the repeater R2 and a terminal placed on the third seat is capable of communicating with the repeater R3.

Because as shown in each installation example described above, the repeater is mounted in front of each seat, the repeater is never shielded by any seat so that it is capable of communicating with a terminal brought into any seat row. Further, terminals existing in different seat rows are capable of communicating with each other.

Further, by installing the repeater R1 in front of the front seat, the repeater R1 is capable of communicating with a navigation system, audio system or the like (not shown) mounted on console easily. By mounting the repeater R3 in front of the third seat, the repeater R3 is capable of communicating with a back camera (not shown) provided on a rear portion of a vehicle. Further, the repeater may be connected to a CD changer, DVD changer, digital TV monitor or the like (not shown) provided in trunk through wire so that it is capable of communicating therewith.

In the above described installation examples, it is assumed that the repeaters R1, R2, R3 are mounted in such a manner that they are capable of communicating with each other securely irrespective of radio communication or wired communication. Further, the quantity of the repeaters is not limited to three, but may be increased as the quantity of seat rows is increased like in bus. Conversely, the quantity of the repeaters may be decreased if that of the seat rows is decreased.

Further, although in the above described installation example, the repeater R1 is mounted on the dash board or front pillar in front of the front seat, it is not restricted to these positions, but the repeater may be mounted on any place in front of the front seat such as rearview mirror and console if it is capable of communicating by radio.

Likewise, the repeaters R2, R3 may be also mounted at any place in front of the second seat and third seat respectively if each of them is capable of communicating by radio. For example, they may be mounted on a bottom of each of the second seat and third seat, floor or the like.

Further, the installation examples shown in FIGS. 2, 5, 6 may be combined with each other.

Although the first embodiment has been described about a case where the repeaters are mounted on a vehicle, this embodiment may be applied to conveyance having seats such as airplane and ship.

Next, a vehicle compartment radio LAN system of a second embodiment will be described with reference to FIG. 8.

Figure 8:
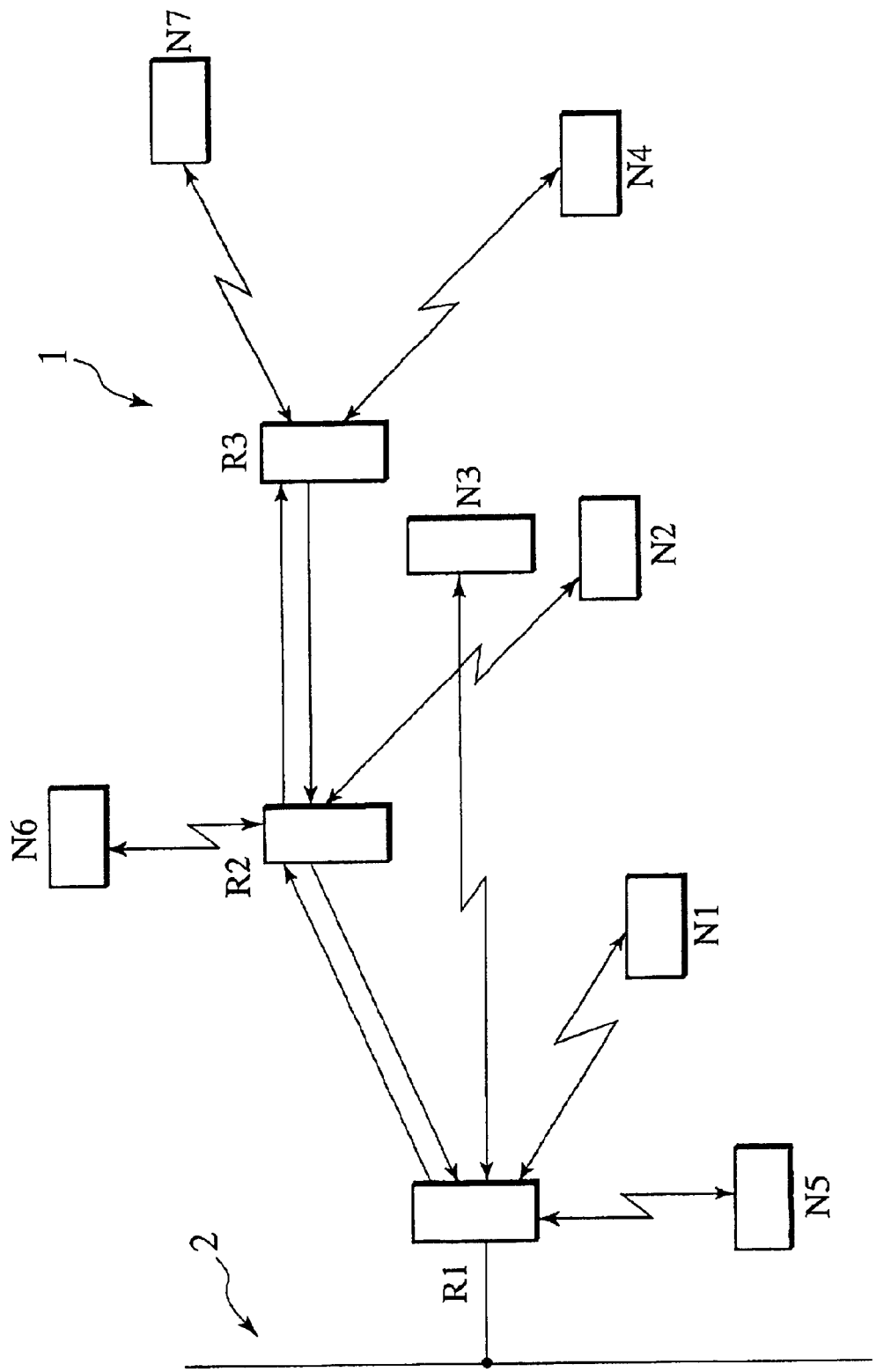
FIG. 8 is a perspective view showing a structure of a second embodiment of the vehicle compartment radio LAN system of the present invention.

As shown in FIG. 8, the vehicle compartment radio LAN system 1 of this embodiment is comprised of plural repeaters R1, R2, R3, which communicate by radio with plural terminals (N1, . . . N7) installed in or brought into the vehicle compartment.

The vehicle compartment radio LAN system 1 shown in FIG. 8 is indicated about a case where the three repeaters R1, R2, R3 are provided. These repeaters R1, R2, R3 cover all region having a possibility that any terminal may exist and are installed at each position having a lowest possibility that electronic wave sent from the terminal may be interrupted. Further, it is assumed that the repeaters R1, R2, R3 are mounted in such a manner capable of communicating securely irrespective of radio communication or wired communication and the repeater R1 is connected to the wired LAN 2.

The vehicle compartment radio LAN system does not communicate with a repeater located most nearby but selects a repeater securing an optimum communication state from plural repeaters.

For example, FIG. 8 indicates a case where seven terminals are available. Although terminals N4, N5, N6, N7 communicate with repeaters R3, R1, R2, R3 located most nearby respectively, terminals N1, N2, N3 do not communicate with repeaters located most nearby but repeaters securing an optimum communication state respectively. This reason can be considered to be that any shielding object exists between the repeater R2 and the terminal N1 and between the repeater R2 and the terminal N3.

To select a repeater securing such an optimum communication state, it is permissible to collect information about reception condition (antenna power, bit error) of electronic wave between each repeater and each terminal at a single repeater which serves as a master repeater and then select a repeater securing an optimum communication state. Alternatively, it is also permissible for each terminal to send a reception condition detecting request to respective repeaters in succession and receive an echo signal about a communication state detected corresponding to the detection request in order to select a repeater securing an optimum communication state therewith.

A hardware structure of each of the repeaters R1, R2, R3 will be described with reference to FIG. 9.

Figure 9:
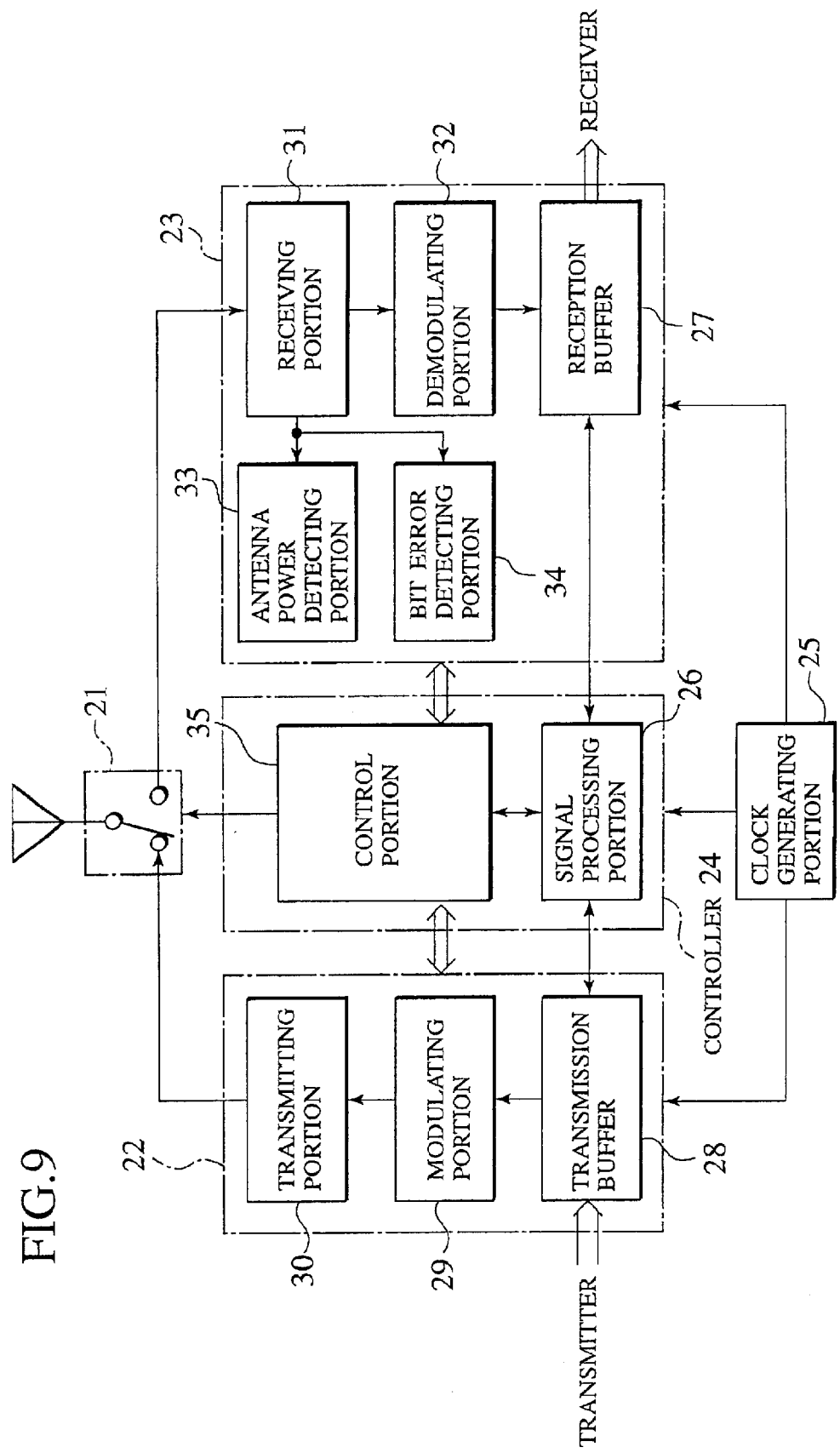
FIG. 9 is a diagram for explaining a structure of the repeater shown in FIG. 8.

As shown in FIG. 9, each repeater comprises an antenna 21 for sending or receiving electronic wave, a transmitter 22 for transmitting electronic wave through this antenna 21, a receiver 23 for receiving electronic wave through the antenna 21, a controller 24 for controlling the transmitter 22 and receiver 23 and a clock generator 25 for generating clocks for these units.

The transmitter 22 includes a transmission buffer 28 for holding transmission data of other repeaters sent from reception buffer 27 of the receiver 23 through a signal processing portion 26 of the controller 24 and transmission data sent from the transmitter, a modulating portion 29 for modulating the transmission data and a transmitting portion 30 for transmitting the transmission data modulated by the modulating portion 29.

The receiver 23 includes a receiving portion 31 for receiving transmission data, a demodulating portion 32 for demodulating the transmission data received by the receiving portion 31 and a reception buffer 27 for holding transmission data sent from the demodulating portion 32 and transmission data sent from the transmission buffer 28 of the transmitter 22 through the signal processing portion 26 of the controller 24. Data received by the receiver 23 is also transmitted to an antenna power detecting portion 33 and a bit error detecting portion 34 and data held by the reception buffer 27 is sent to other receivers and the transmission buffer 28.

The controller 24 comprises a signal processing portion 26 for carrying out signal processing such as attachment of transmission data destination, sender's address and the like and a controlling portion 35 for controlling the signal processing portion 26, transmitter 22 and receiver 23 and switching transmission and reception.

The controlling portion 35 includes a CPU for carrying out various processings and a memory for storing an instruction for this processing. Instructions and timing restriction carried out by this control portion 35 are held by this memory and loaded onto the CPU as required for execution.

Next, an installation example of a repeater in the radio LAN system of the second embodiment will be described.

Figure 10:
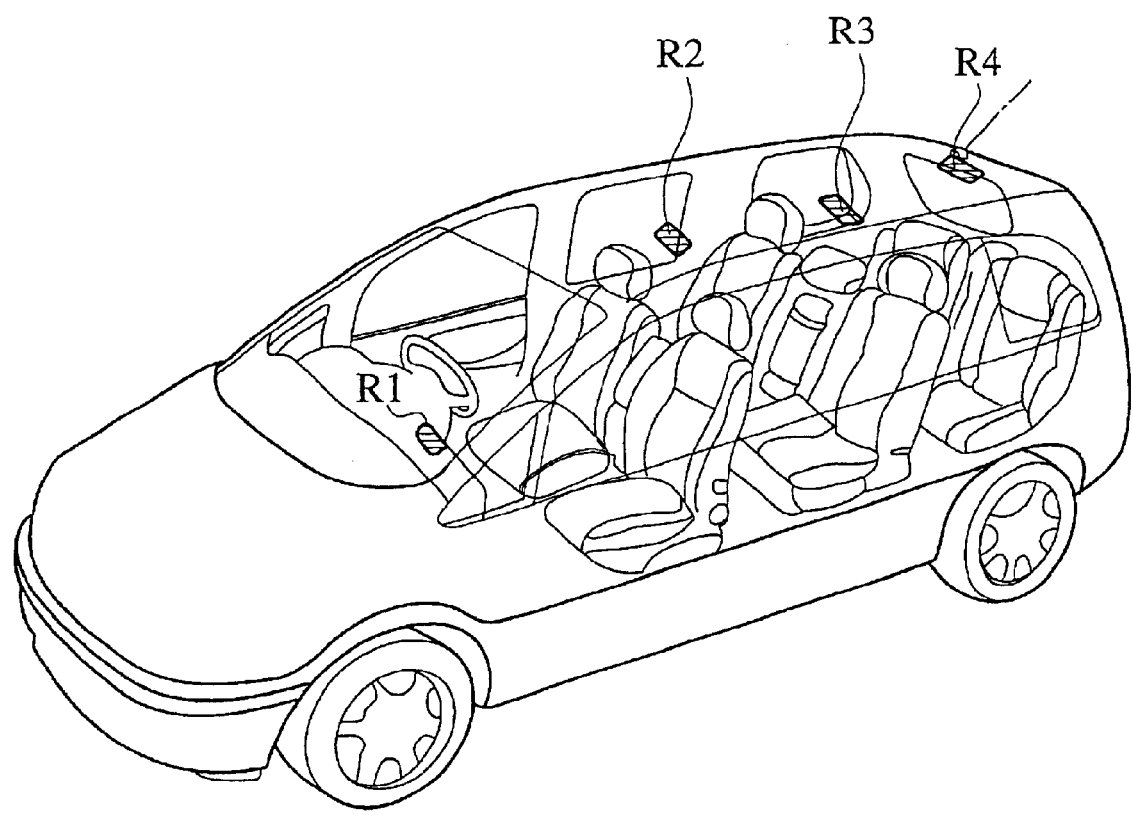
FIG. 10 is a perspective view showing a first installation example of the second embodiment of the vehicle compartment radio LAN system of the present invention.

FIG. 10 is a perspective view showing a first installation example. As shown in FIG. 10, the repeater R1 is placed on a dash board in front of the front seat so as to communicate with a terminal brought into the front seat.

A repeater R2 is mounted on the ceiling above the front seat to communicate with a terminal brought into the front seat and a terminal brought into a second seat. Likewise, a repeater R3 is mounted on the ceiling above the second seat to communicate with a terminal brought into the second seat and a terminal brought into a third seat.

A repeater R4 is mounted on the ceiling in front of the third seat to communicate with a terminal brought into the third seat.

Figure 11:
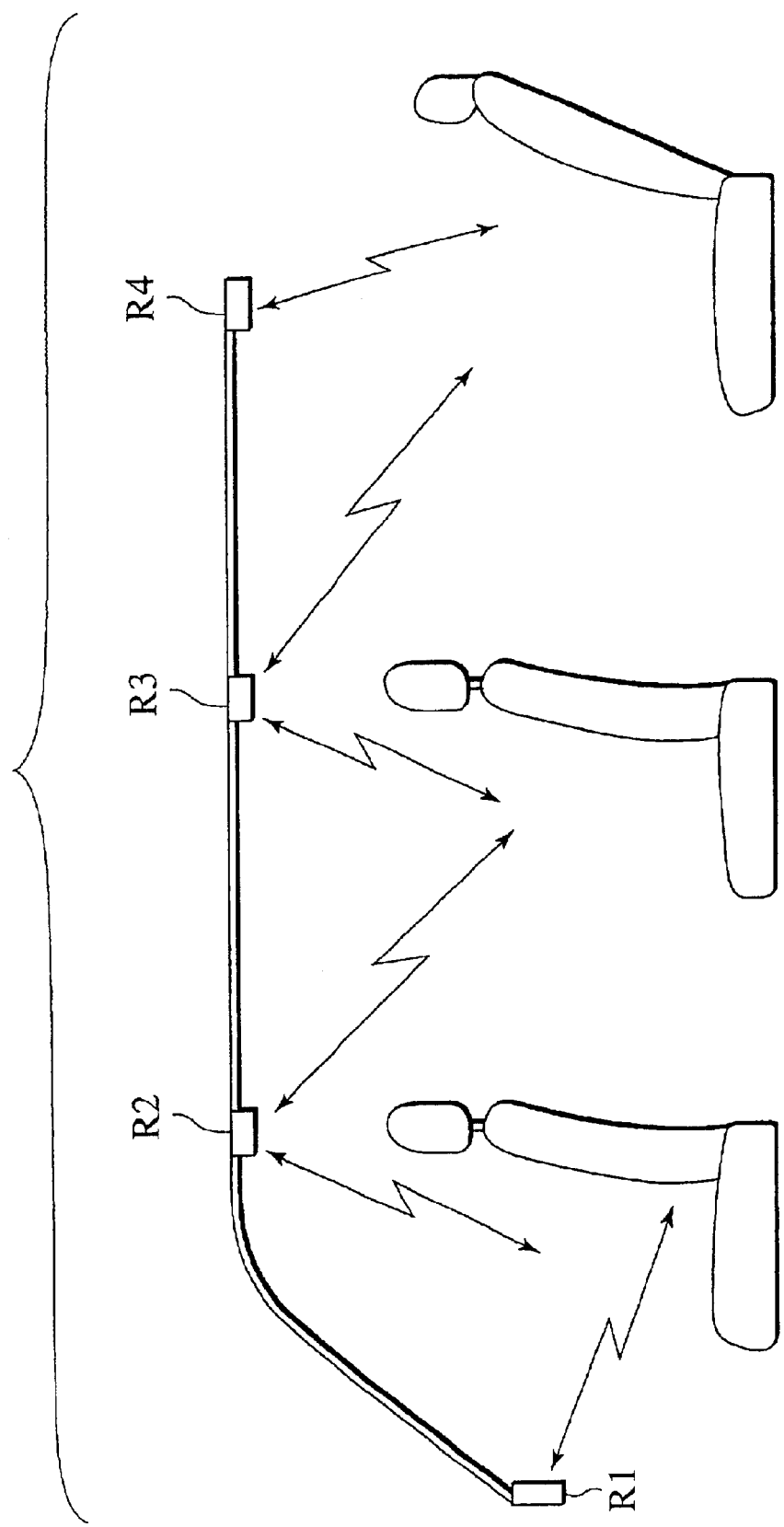
FIG. 11 is a diagram for explaining communication by a repeater in the vehicle compartment radio LAN system shown in FIG. 10.

Consequently, as shown in FIG. 11, a terminal installed in the front seat is capable of communicating with a repeater securing a better communication state of the repeater R1 or R2. A terminal installed in the second seat is capable of communicating with a repeater securing a better communication state of the repeater R2 or R3. A terminal installed in the third seat is capable of communicating with a repeater securing a better communication state of the repeater R3 or R4.

Figure 12:
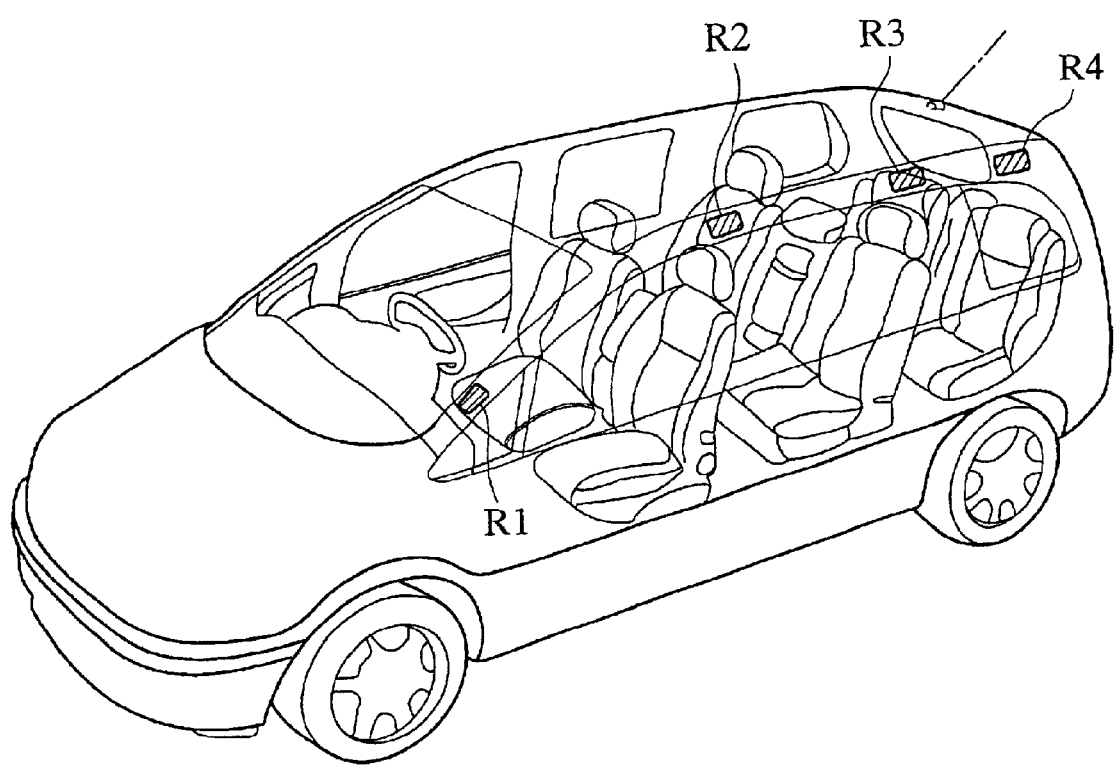
FIG. 12 is a perspective view showing a second installation example of the second embodiment of the vehicle compartment radio LAN system of the present invention.

Next, FIG. 12 is a perspective view showing a second installation example. As shown in FIG. 12, the repeater R1 is mounted on a front pillar in front of the front seat to communicate with a terminal brought into the front seat.

The repeater R2 is mounted on the drip line to the left above the front seat to communicate with a terminal brought into the front seat and a terminal brought into the second seat. Likewise, the repeater R3 is mounted on the drip line to the left above the second seat to communicate with a terminal brought into the second seat and a terminal brought into the third seat.

Further, the repeater R4 is mounted on the drip line to the left in front of the third seat to communicate with a terminal brought into the third seat.

As a result of the installation of the repeaters as shown in FIG. 12, a terminal installed in the front seat is capable of communication with a repeater securing a better communication state of the repeater R1 or R2 like the first embodiment. A terminal installed in the second seat is capable of communicating with a repeater securing a better communication state of the repeater R2 or R3. A terminal installed in the third seat is capable of communicating with a repeater securing a better communication state of the repeater R3 or R4.

Figure 13:
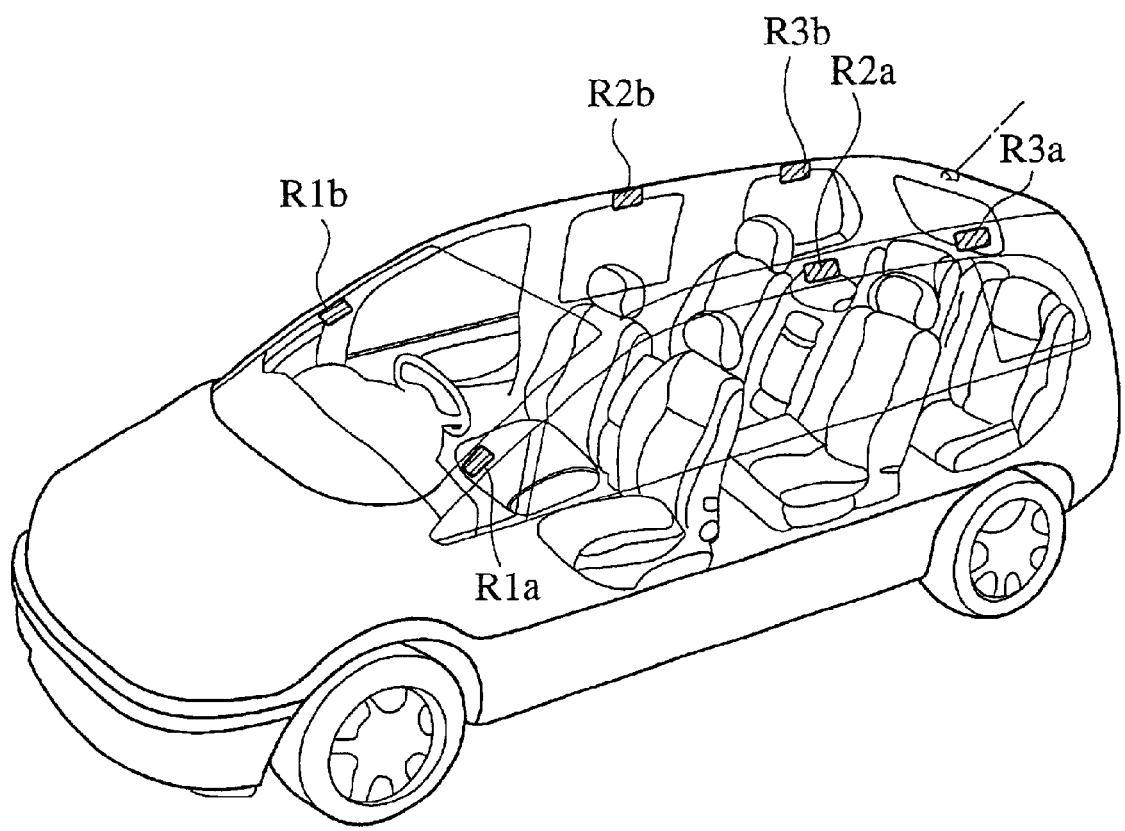
FIG. 13 is a perspective view showing a third installation example of the second embodiment of the vehicle compartment radio LAN system of the present invention.

As a third installation example, the repeaters may be mounted on the front pillars and drip lines of both the left and right sides as shown in FIG. 13.

As shown in FIG. 13, repeaters R1a, R1b are mounted on the front pillars in front of the front seat. Repeaters R2a, R2b are mounted on the drip lines in front of the second seat. Repeaters R3a, R3b are mounted on the drip lines in front of the third seat.

Figure 14:
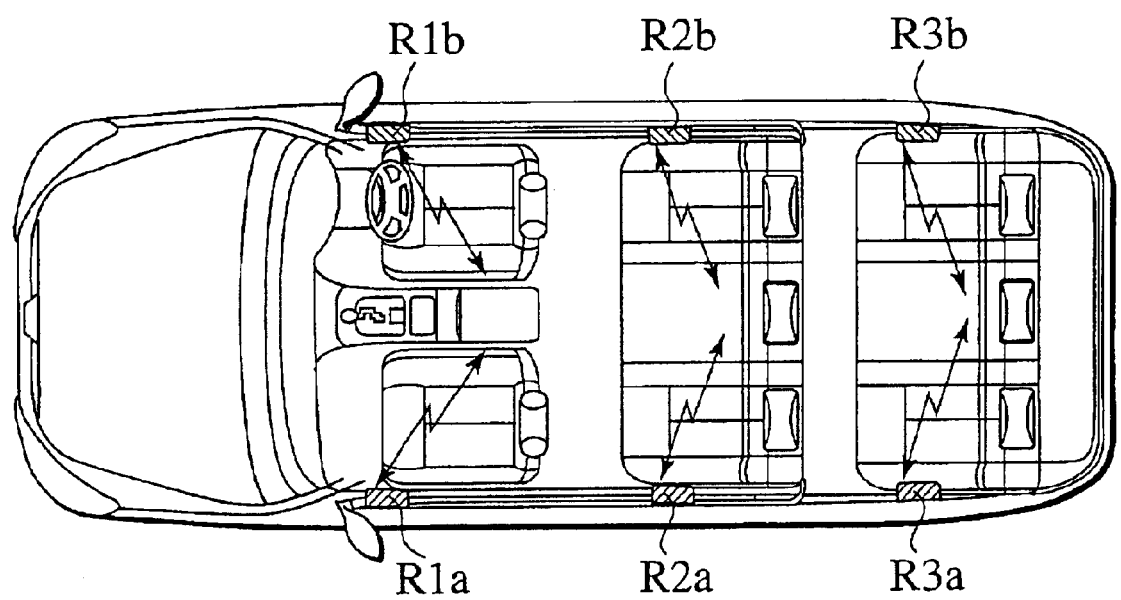
FIG. 14 is a diagram for explaining communication by a repeater in the vehicle compartment radio LAN system shown in FIG. 13.

According to the third installation example, as shown in FIG. 14, a terminal installed in the front seat is capable of communicating with a repeater securing a better communication state of the repeater R1a or R1b. A terminal installed in the second seat is capable of communicating with a repeater securing a better communication state of the repeater R2a or R2b. A terminal installed in the third seat is capable of communicating with a repeater securing a better communication state of the repeater R3a or R3b.

As shown in each installation example, plural repeaters are provided at a position allowing communication with a terminal installed in each seat row and a repeater securing a optimum communication state is selected from the plural repeaters to carry out communication by radio. Consequently, radio communication can be kept continuously even under such an environment in which no sufficient space can be secured and a terminal or shielding object may be moved as the vehicle compartment.

Further, by mounting the repeater R1 in front of the front seat, the repeater R1 is capable of communicating with a navigation system, audio system or the like (not shown) mounted on console easily. By mounting the repeater R3, R3b or R4 on the third seat, the repeater R3 is capable of communicating with a back camera (not shown) provided on a rear portion of a vehicle. Further, the repeater may be connected to a CD changer, DVD changer, digital TV monitor or the like (not shown) provided in trunk through wire so that it is capable of communicating therewith.

In the above described installation examples, it is assumed that the repeaters R1, R2, R3, R3a, R3b, R4 are mounted in such a manner that they are capable of communicating with each other securely irrespective of radio communication or wired communication. Further, the quantity of the repeaters is not limited to four or six, but may be increased as the quantity of seat rows is increased like in bus. Conversely, the quantity of the repeaters may be decreased if that of the seat rows is decreased.

Further, although in the above described installation example, the repeater R1 is mounted on the dash board or front pillar in front of the front seat, it is not restricted to these positions, but the repeater may be mounted on any place such as rearview mirror and console as long as it is capable of communicating by radio.

Likewise, the repeaters R2, R3, R3a, R3b, R4 maybe also mounted at any place respectively if each of them is capable of communicating by radio with a terminal installed in the second seat or third seat.

Further, the installation examples shown in FIGS. 2, 5, 6, 10, 12 and 13 may be combined with each other.

Although the second embodiment has been described about a case where the repeaters are mounted on a vehicle, this embodiment may be applied to conveyance having seats such as airplane and ship.

As described above, according to the vehicle compartment radio LAN system of the first embodiment of the present invention, communication can be carried out between terminals installed in different seat rows.

Further, the vehicle compartment radio LAN system of the second embodiment makes it possible to communicate continuously by radio even under such an environment in which no sufficient space can be secured and a terminal or shielding object is moved as vehicle compartment.

It should be understood that many modifications and adaptations of the invention will become apparent to those skilled in the art and it is intended to encompass such obvious modifications and changes in the scope of the claims appended hereto.

What is claimed is:

1. A vehicle compartment radio LAN system comprising:
    a plurality of repeaters mounted in each of a plurality of seat rows; and
    a terminal positioned in one of the plurality of seat rows and configured to communicate through one of the plurality of repeaters by radio, said one of the plurality of repeaters securing an optimum communication state,
    wherein the repeater securing the optimum communication state is selected based on information about reception condition including antenna power and bit error of electronic wave between each repeater.

2. A vehicle compartment radio LAN system, comprising:
    a plurality of repeaters mounted in each of a plurality of seat rows; and
    a terminal positioned in one of the plurality of seat rows and configured to communicate through one of the plurality of repeaters by radio, said one of the plurality of repeaters securing an optimum communication state,
    wherein the repeater securing the optimum communication state is selected based on respective echo signals of repeaters including information about respective communication state detected.

3. A radio LAN system of a vehicle compartment including at least three seat rows, comprising:
    at least first, second, and third repeaters configured to communicate with each other and with a terminal in the vehicle compartment by radio,
    wherein the first repeater is mounted to a dashboard of the vehicle compartment in front of a seat in a first seat row, the second repeater is mounted to a back of the seat in the first seat row, and the third repeater is mounted to a back of a seat in a second seat row.

4. A radio LAN system of a vehicle compartment including at least three seat rows, comprising:
    at least first, second, and third repeaters configured to communicate with each other and with a terminal in the vehicle compartment by radio,
    wherein the first repeater is mounted to a dashboard of the vehicle compartment in front of a seat in a first seat row, the second repeater is mounted to a first ceiling portion of the vehicle compartment between the first seat row and a second seat row, and the third repeater is mounted to a second ceiling portion of the vehicle compartment between the second seat row and a third seat row.

5. A radio LAN system of a vehicle compartment including at least three seat rows, comprising:
    at least first, second, and third repeaters configured to communicate with each other and with a terminal in the vehicle compartment by radio,
    wherein the first repeater is mounted to a front pillar of the vehicle compartment in front of a seat in a first seat row, the second repeater is mounted to a drip line of the vehicle compartment at a position between the first seat row and a second seat row, and the third repeater is mounted to the drip line at a position between the second seat row and a third seat row.

6. A radio LAN system of a vehicle compartment including a plurality of seat rows, comprising:
    a plurality of repeaters mounted in each seat row and configured to communicate with each other and with a terminal in the vehicle compartment by radio,
    wherein one of the plurality of repeaters in each seat row secures an optimum communication state, the repeater securing the optimum communication state being selected based on information about reception condition including antenna power and bit error of electronic wave between each repeater.

7. A radio LAN system of a vehicle compartment including a plurality of seat rows, comprising:
    a plurality of repeaters mounted in each seat row and configured to communicate with each other and with a terminal in the vehicle compartment by radio,
    wherein one of the plurality of repeaters mounted in each seat row secures an optimum communication state, the repeater securing the optimum communication state being selected based on respective echo signals of repeaters including information about respective communication state detected.

* * * * *